E. E. GOLD.
THERMOSTATIC SYSTEM.
APPLICATION FILED OCT. 9, 1917.

1,292,396.

Patented Jan. 21, 1919.

WITNESSES:
Rene Bruine
Harry M. Brand

INVENTOR:
Edward E. Gold,
By Attorneys,
Fraser, Durk & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

THERMOSTATIC SYSTEM.

1,292,396.    Specification of Letters Patent.    Patented Jan. 21, 1919.

Application filed October 9, 1917.   Serial No. 195,501.

*To all whom it may concern:*

Be it known that I, EDWARD E. GOLD, a citizen of the United States of America, residing in the borough of Manhattan, city, county, and State of New York, have invented certain new and useful Improvements in Thermostatic Systems, of which the following is a specification.

This invention relates to a valve designed to control the admission of steam to a radiator or radiating system, and is of that class of valves in which a thermostat is provided for closing the valve and shutting off the steam when the temperature of the apartment being heated reaches a predetermined maximum. For this purpose it is common to arrange a thermostatic device in the room or apartment being heated, which device controls an electric circuit which in turn controls the operation of the steam-inlet valve. Such control of the valve has been heretofore accomplished by admitting current to an electric heating device in operative relation with a thermo-expansion device, so that when the room reaches its prescribed temperature the room thermostat closes the electric circuit and the electric heater begins to generate heat, and this heat is communicated to the expansion device, which expands and closes the valve. Such a combination is shown in my Patent No. 1,087,231, granted February 17, 1914, where it is illustrated as applied to control the admission of steam to the steam heating pipes of a railway car.

The present invention aims to provide a more sensitive electro-thermic valve which shall be applicable to the operation of the steam-inlet valves of radiators for ordinary building service or to thermostatic control or other heat governing devices. My invention provides a construction in which the electro-thermic element is highly sensitive, so as to be well adapted for this service.

In the accompanying drawings,—

Figure 1:
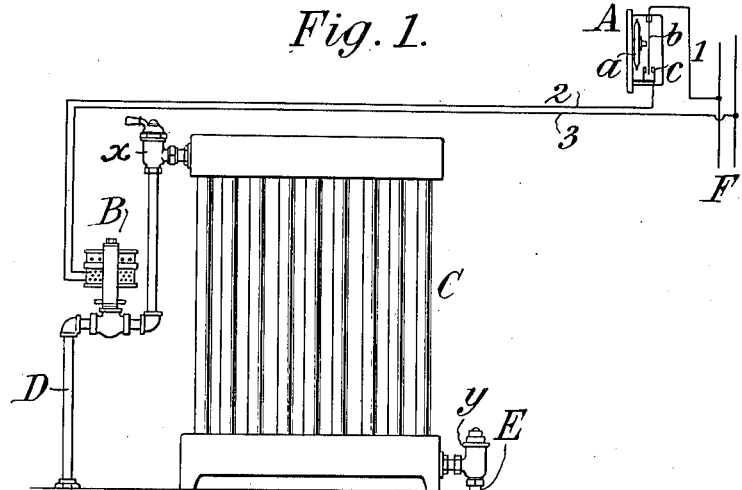
Figure 1 shows a radiator, an electro-thermostatic valve therefor, room thermostat, and electric circuit connections.

Referring to Fig. 1, A shows diagrammatically a room thermostat or temperature controller, which may be of any known construction; B, as a whole, is the electro-thermic steam-inlet valve; C is the radiator; D is the steam pipe leading to the radiator, and E is a drainage pipe leading from the radiator. The invention is best adapted to steam heating systems in which a low steam pressure is used.

The room thermostat A shown comprises a thermostatic vessel $a$ which, when it expands, moves a leaf spring $b$ into contact with a terminal $c$ and thereby closes the circuit from main leads F through wires 1, 2 and 3, in which circuit is included an electric heater G of any suitable kind. When the room cools and the thermostat $a$ contracts, the resilience of the spring $b$ moves it away from the contact $c$ and breaks the circuit. This breaking is practically accomplished with a quick or snap action, but this detail, as it has nothing to do with the present invention, is not illustrated.

Figure 2:
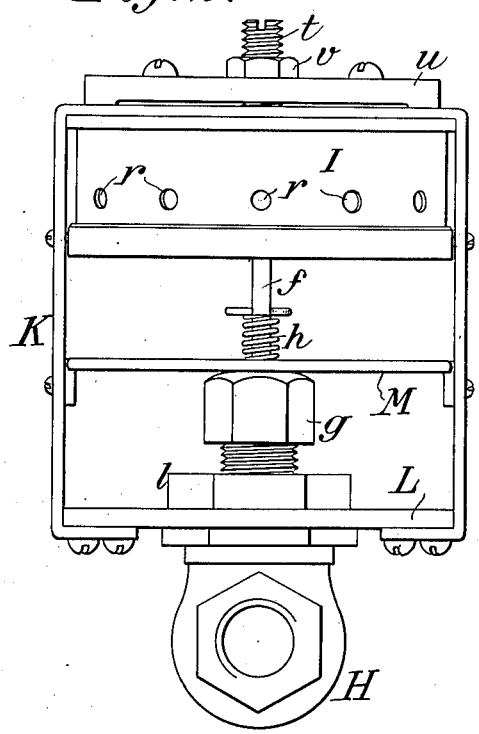
Fig. 2 is an elevation of the radiator valve.
Figure 3:
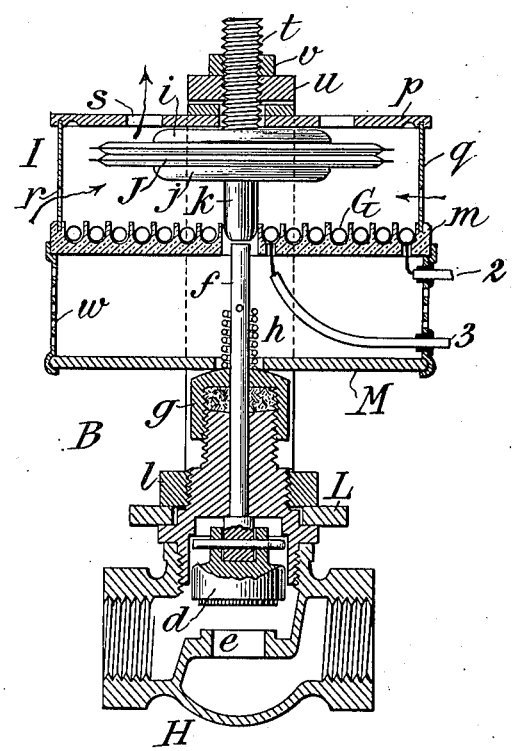
Fig. 3 is a vertical mid-section of this valve.

The electro-thermic valve B is shown in detail in Figs. 2 and 3. It comprises a steam valve proper H of any ordinary construction, being shown as having a tappet valve $d$ closing down against a seat $e$; the valve $d$ is mounted on a sliding stem $f$ which passes up through a stuffing box $g$ and is provided with a spring $h$ for opening the valve. Above this valve is a casing I forming an inclosed chamber within which is the thermo-motive device J, which is shown as an ordinary type of double diaphragm vessel made of thin metal and containing a highly volatile liquid. This diaphragm vessel is confined between a fixed abutment $i$ above, and a movable abutment $j$ below, the latter having a stem $k$ in line with and just above the valve stem $f$.

When the circuit is closed the electric heater G begins to generate heat and causes an upward circulation of heated air to the thermo-motor or diaphragm vessel J, which is located directly above, and slightly removed from, the electric heater. This heat expands the vessel J and forces down the parts $j$ $k$ $f$ and closes the valve, thereby shutting off the steam. When eventually the room cools sufficiently so that the thermostat A breaks the circuit, the electric heater ceases to generate heat and the contents of the casing I begin to cool, and as the vessel J cools it contracts and the valve $d$ opens under the stress of the spring $h$, thereby admitting more steam.

The electric heater G is shown as formed of a coil or helix of resistant wire which is confined in deep grooves in a non-conducting and heat-proof supporting plate or base m, which may be of porcelain or asbestos. This base m forms the bottom of the casing I. The top of the casing is formed of a plate p, and its sides of a cylindrical wall q. The casing I is supported by means of a frame K fastened to a crosspiece L which is confined against the bonnet of the valve H by means of a clamping nut l, or any other supporting construction may be used.

To accelerate the cooling of the vessel J and the consequent readmission of steam, ventilating openings r s are provided in the casing I below and above the vessel J so as to admit a circulation of cooling air through this casing and around the thermostat.

The expansion vessel J is adjusted by means of a screw stem t screwing in a crosshead u mounted on the frame K and set by a nut v.

To shield the chamber I from the effect of heated air ascending from the valve H, an intercepting plate or shield M is provided, which may be of metal or any non-conducting material, as desired. In Fig. 3 the space between this shield M and the plate m is closed by means of a band w, preferably of foraminous non-heat-conducting material such as perforated asbestos, although perforated metal or coarse wire gauze may be used. It is best to use non-heat-conducting material in order to avoid conduction of heat from the plate M to the plate m; it is best to make it foraminous in order that cooling air may circulate through it.

The invention thus described provides a very simple, cheap, sensitive and efficacious construction of electro-thermostatic steam admission valve which, with a suitable thermostat A, is adapted to maintain equable temperature in the room at the point at which the thermostat A is set (such thermostats being commonly made adjustable for temperature).

The invention may be varied in details of construction and arrangement, according to the particular use or service, or particular environment in which the valve is to be used.

It will be understood that by constructing the electric heater G in a horizontal plane beneath the thermo-motive element, and preferably of naked resistant wire, the thermo-motor is heated from the electric heater both by radiant heat and by convection.

My invention does not forbid the use of electric heaters of known construction in which the air circulates up through the heater itself; in fact, such a heater gives highly satisfactory results.

It is practically essential to the operativeness of the structure described, that the electric heater shall be out of contact with, and somewhat removed from the thermo-expansion vessel, and that ample ventilation shall be provided; as otherwise the heater and vessel cool so slowly after the shutting off of the current by the thermostat that a long time elapses before the vessel contracts and permits the steam valve to reopen, with the result that the apartment is apt to become too cool before heat is again automatically turned on. With my invention the heating and cooling are so rapid and effective that the thermo-valve responds quickly to the control of the thermostat, with the result that the room is kept at a temperature which is stable within very narrow limits of fluctuation.

Nor can the results of my invention be attained by locating the electric heater above the expansion vessel. Such vessels are only partly filled with vaporizable liquid and the electric heater should be applied beneath so that it may heat the liquid pool and generate vapor to expand the vessel. Efforts to locate such vessels in a vertical plane with the heater alongside the vessel have not been successful because the heat is mainly applied to the portion of the vessel containing vapor, where it is relatively ineffective.

In this application, I make no claim to the feature of holding the valve closed by exerting pressure through the stem t and expansion vessel J, since such operation is disclosed and claimed in my co-pending application, Serial No. 232,018, filed May 2, 1918.

It is desirable to equip the radiator not only with the thermostatic valve B, but also with a hand-controlled inlet valve such as is shown at x in Fig. 1. Such valves are known which are adapted to graduate the flow of steam so that it may be regulated at will, according to the desire of the person operating the valve, and so that the radiator may be filled to varying volumes with steam. It is also desirable to add at the outlet of the radiator a trap such as shown at y for purging off water of condensation. This trap may be of any of the well-known forms of thermostatic trap.

While my invention is mainly useful for operating steam valves and has been designed with a special view to such use, it is not confined to use for controlling the admission of steam to a radiator, but is variously applicable to thermostatic control of the heating of rooms or apartments or to thermostatic control of any movable element, such, for instance, as a damper.

I claim as my invention:

1. For use in a thermostatic system, a thermomotor comprising a diaphragm vessel containing a vaporizable liquid, and located in a horizontal plane, so that such liquid forms a pool on the bottom of the vessel, and an electric heater mounted beneath the vessel to heat its bottom and vaporize such liquid, and spaced apart from the vessel to form an intervening air passage for effectively cooling the vessel when the heater is inoperative.

2. A thermomotor according to claim 1, having a casing inclosing the vessel and heater, and perforated to admit circulation of air.

3. A thermomotor according to claim 1, having a heat intercepter beneath the electric heater.

4. A thermomotor according to claim 1, having a heat intercepting plate located beneath and spaced apart from the electric heater to form an intervening air space to cool the heater when inoperative.

5. A thermomotor according to claim 4, having a casing perforated to circulate air between said plate and heater.

6. A valve, a thermomotor for operating said valve, and an electric heater for heating said motor, spaced apart from the motor to form an air passage for cooling the motor.

In witness whereof I have hereunto signed my name.

EDWARD E. GOLD.